United States Patent Office 3,347,869
Patented Oct. 17, 1967

3,347,869
PROCESS FOR PRODUCING TRIOXANE
Per G. M. Flodin, Per Kornfeldt, and Jonn Inge Gardshol, Perstorp, Sweden, assignors to Skanska Attikfabriken AB, Perstorp, Sweden
No Drawing. Filed July 6, 1964, Ser. No. 380,689
Claims priority, application Sweden, July 15, 1963, 7,822/63
7 Claims. (Cl. 260—340)

Trioxane, which is a cyclic trimer of formaldehyde, is conventionally produced by distilling a solution of formaldehyde in water in the presence of an acid catalyst. The method includes distilling off an azeotropic mixture consisting of trioxane, formaldehyde and water from the reaction mixture. The boiling point of the azeotropic mixture is 92–93° C. The process requires relatively complicated and expensive apparatus partly because of the boiling point of the azeotropic mixture being very close to that of the water and partly because of the necessity of the apparatus to be acid resistant. The method gives a low production per time unit with regard to the volume of the apparatus and causes substantial losses of formaldehyde by the forming of by-products, which also are recovered in the obtained trioxane.

The purpose of the present invention is to bring about a new and improved method for producing trioxane.

It has surprisingly been shown that trioxane is formed in a good yield when gaseous formaldehyde is brought into contact with a catalyst of the Lewis acid type. The formaldehyde gas may be undiluted or admixed with for example inert gases, in the latter case the content of formaldehyde preferably being larger than 5% by volume. The method does not require a completely dry formaldehyde gas.

Water vapour may be present in relatively large concentrations, but some upper limit must be maintained in order to avoid the complications which would develop if paraformaldehyde were permitted to form in the catalyst bed. The catalyst should preferably be a strong Lewis acid, such as sulphuric acid, phosphoric acid, zinc chloride, sulphone acids or ion exchanger having sulphone acid groups. In a preferred embodiment of the invention the catalyst is suspended on a carrier of conventional type e.g. silica gel, charcoal or other commercially available carriers. The temperature of the catalyst during the reaction should be in the range of 60–150° C., and preferably between 90 and 120° C. The lower limit of the temperature is set at a value which is sufficiently high to avoid the formation of paraformaldehyde and the upper limit of the temperature is set at a value above which the conversion to trioxane would be less than an acceptable minimum.

The process according to the invention gives a very little amount of undesirable by-products, and unreacted formaldehyde can therefore be returned to the reaction zone after separating off the formed trioxane, so that high total yields may be obtained.

The separation of the trioxane may be carried out in different ways, e.g. by cooling out the formed trioxane or by using chlorinated hydrocarbons, which are good solvents for trioxane, but which are poor solvents for formaldehyde. Another method is to allow the unconverted formaldehyde to polymerize or to react with some other substance for forming a desired product, which later on may be separated from the trioxane.

The following embodiment examples in laboratory scale are intended to give information concerning the practical performance of the invention:

Example 1

α-Polyoxymethylene is continuously fed into a three-necked flask having a volume of 3 litres, the rate being 180 g. per hour (6 gmol). At the same time nitrogen gas is simultaneously introduced in an amount corresponding to 75 litres per hour. The flask is maintained within a temperature range of 180–200° C., at which temperature the α-polyoxymethylene decomposes to monomeric formaldehyde. The total gas volume is approx. 200 l./hr. The gas is conducted through jacketed glass pipes, which are kept at a temperature of about 100° C., to the top of a veritcally arranged catalyst pipe having the dimensions 2 x 75 cm. and which is heated to 90° C. The catalyst mass consists of finely grained silica gel containing 10% by weight phosphoric acid. In the manufacture of the catalyst mass the acid is well mixed with silica gel and is thereafter heated to 220° C. during several hours. The gases streaming out from the lower part of the catlayst pipe are conducted to a washing column, in which the trioxane and the formaldehyde are absorbed in water.

After three hours the experiment was interrupted. The trioxane content in the washing liquid was determined gas chromatographically, while the formaldehyde content was determined titrimetrically according to the bisulphite method.

The analysis results showed that 38% of the formaldehyde fed to the catalyst column had been converted to trioxane. By shaking out the washing water with methylene chloride 180 g. trioxane was obtained after evaporation.

Examples 2–5

Example 1 was repeated except for the variation that the amount of phosphoric acid used for admixing the silica gel was changed. The result are specified in the table below. In the following tables the results of Example 1 are repeated for comparison purposes.

| Example No. | Amount of $H_3PO_4$ as percent by weight of the carrier $SiO_2$ | Yield of trioxane as percent of formaldehyde added |
|---|---|---|
| 2 | 0 | 0.1 |
| 3 | 1 | 3.1 |
| 1 | 10 | 38 |
| 4 | 20 | 50 |
| 5 | 40 | 39 |

Examples 6–9

Example 1 was repeated except for the sole variation that the jacket temperature in the catalyst column was varied. The results are tabulated below.

| Example No. | Jacket temperature in the catalyst pipe | Yield of trioxane as percent of formaldehyde added |
|---|---|---|
| 6 | 80 | 25 |
| 1 | 90 | 38 |
| 7 | 110 | 27 |
| 8 | 140 | 1.4 |
| 9 | 150 | 0.1 |

Examples 10–13

Example 1 was repeated but other materials of the type Lewis acid according to the table was used.

| Example No. | Catalyst | Amount of catalyst as percent by weight of carrier | Yield of trioxane as percent of formaldehyde added |
|---|---|---|---|
| 1 | $H_3PO_4$+silica gel | 10 | 38 |
| 10 | $H_2SO_4$+silica gel | 10 | 43 |
| 11 | $H_2SO_4$+silica gel | 1 | 40 |
| 12 | $ZnCl_2$+silica gel | 10 | 25 |
| 13 | Ion exchanger having sulphone acid groups. | | 2 |

The invention is not limited to the above-mentioned embodiment examples but can be modified in different ways within the scope of the invention.

The method is especially suitable for continuous production of trioxane thus giving economical advantage.

Though only a limited number of examples concerning the use of Lewis acids have been mentioned, the method is applicable when using several other materials having the characteristics of Lewis acid. Such materials are described in the literature.

We claim:
1. A process for the preparation of trioxane which comprises bringing gaseous formaldehyde at a temperature of 60°–150° C. into contact with a Lewis acid catalyst to produce primarily trioxane, and recovering trioxane.
2. The process of claim 1 in which the Lewis acid catalyst is supported on an inert carrier.
3. The process of claim 2 in which the Lewis acid catalyst is selected from the group consisting of sulfuric acid, phosphoric acid, and zinc chloride.
4. The process of claim 1 in which the temperature is 90°–120° C.
5. A process for the preparation of trioxane which comprises bringing a mixture of an inert gas and gaseous monomeric formaldehyde into contact with a Lewis acid catalyst at a temperature of 60°–150° C. to form a reaction product comprising primarily trioxane, and recovering trioxane from the resulting gaseous mixture.
6. A continuous process for the preparation of trioxane which comprises bringing gaseous monomeric formaldehyde at a temperature of 60°–150° C. into contact with a Lewis acid catalyst on a silica gel carrier in a reaction zone to form trioxane, withdrawing the reaction products from the reaction zone, recovering trioxane from the reaction products, and recycling to the reaction zone unreacted formaldehyde which was withdrawn with the reaction products.
7. A process according to claim 6, wherein said Lewis acid catalyst is selected from the group consisting of sulphuric acid and phosphoric acid, said silica gel carrier having been impregnated with said Lewis acid catalyst.

References Cited
UNITED STATES PATENTS 1,864,908  6/1932  Jaeger _____ 260—340

OTHER REFERENCES

Australian Abstract of patent application No. 53,098–59, publ. Mar. 24, 1960.

WALTER A. MODANCE, *Primary Examiner.*

N. S. MILESTONE, *Assistant Examiner.*

UNITED STATES PATENT OFFICE
CERTIFICATE OF CORRECTION

Patent No. 3,347,869                      October 17, 1967

Per G. M. Flodin et al.

It is hereby certified that error appears in the above numbered patent requiring correction and that the said Letters Patent should read as corrected below.

In the heading to the printed specification, lines 4 and 5, for "Skanska Attikfabriken AB" read -- Perstorp Aktiebolag --; column 2, line 9, for "veritcally" read -- vertically--; line 31, for "result" read -- results --; line 60, for "was" read -- were --; column 3, line 19, for "sulfuric" read -- sulphuric --.

Signed and sealed this 4th day of March 1969.

(SEAL)
Attest:

Edward M. Fletcher, Jr.                    EDWARD J. BRENNER
Attesting Officer                        Commissioner of Patents